UNITED STATES PATENT OFFICE.

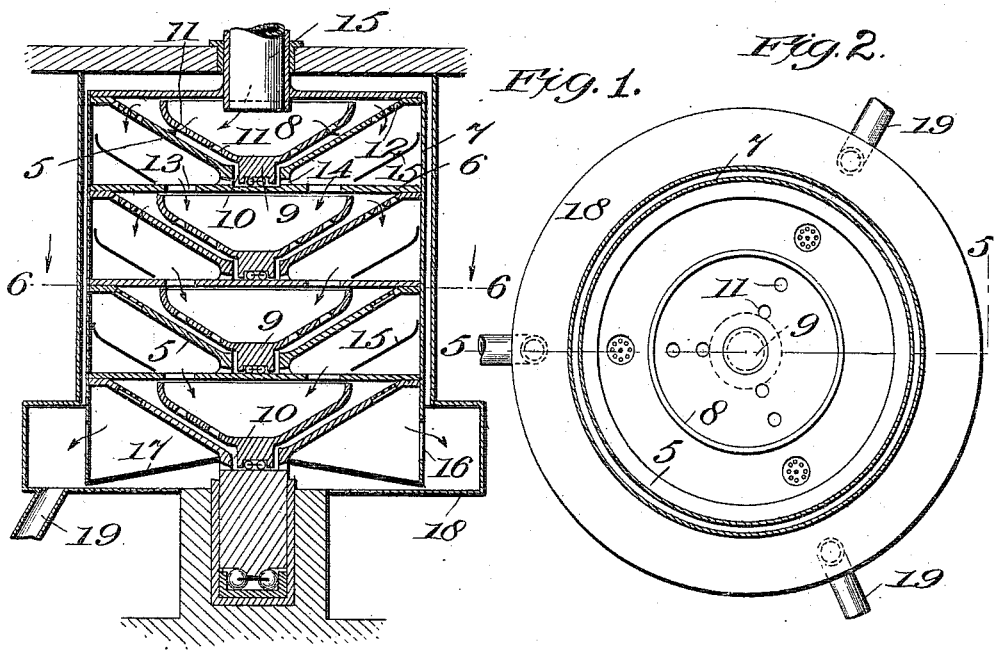

WILLIAM B. BARY, OF ST. PETERSBURG, RUSSIA.

MILL.

985,721.

Specification of Letters Patent. Patented Feb. 28, 1911.

Application filed September 16, 1909. Serial No. 518,118.

*To all whom it may concern:*

Be it known that I, WILLIAM B. BARY, a citizen of the United States, residing at St. Petersburg, Russia, have invented a new and useful Improvement in Mills, of which the following is a specification.

This invention relates to grinding mills, especially of the multiple type, and has for its object to provide a mill of simple and durable construction and which shall be thoroughly effective for the purpose designed.

The preferred embodiment of my invention is illustrated in the accompanying drawing, in which like characters of reference indicate corresponding parts.

Figure 1 is a vertical section of a mill constructed in accordance with my invention, and Fig. 2 is a horizontal section taken on line 6—6 of Fig. 1.

In the drawings, the mill consists of a series of tapering casings 5, mounted on a support 6, and all secured within a cylindrical casing 7, the construction of each one of the mills being the same. Inside each of the casings 5 is mounted a tapering cup 8, supported by antifriction devices, and having a lower central extension 9, entering into a bushing 10 in the casing 5. The cups 8 are provided with openings 11 and the casings 5 are provided with openings 12 near the top thereof. Supports or partitions 6 are provided with openings 13 located above the cup in the next compartment of the mill.

15 represents deflectors so arranged as to direct the material coming through the openings 12 into the openings 13. The lower end of the casing 5 is provided with openings 14 to prevent clogging.

15 represents a supply pipe for the material to be ground, and the lower part of the casing 7 is provided with openings 16 and an inclined bottom 17, so that the ground material may pass out into the casing 18, from whence it is carried away by the discharge pipes 19.

The operation of the mill is as follows: The material to be ground is delivered through the pipe 15, which acts also as a ate space between the cup 8 and the casing 7 being revolved by means not shown. Under the action of centrifugal force, it passes through the openings 11 into the intermediate space between the cup 8 and the casing 5. As the cup 8 has, as already described, a rotary and reciprocatory movement, the material between the cup 8 and the casing 5 becomes ground and by the action of centrifugal force is delivered through the openings 12, falling upon the deflectors 15 and passing through the holes 14 into the second cup of the series, where the operation is repeated, and this operation continues until the material is finally delivered to the discharge pipes 19, which are preferably connected to an exhaust fan (not shown).

It is to be understood that slight changes in the form, proportion and minor details of construction may be resorted to without departing from the spirit of the invention.

I claim:—

1. The combination of a rotatable casing having a central cut away portion and a rotatable cup loosely mounted in said cut away portion, both casing and cup being provided with discharge openings, substantially as described.

2. The combination of a rotatable, perforated casing having its central part cut away, a perforated cup, having a downward extension loosely mounted in the cut away portion, and antifriction supporting devices between said extension and said casing, substantially as described.

In testimony whereof, I have signed my name to this specification in the presence of two subscribing witnesses.

WILLIAM B. BARY.

Witnesses:
 ALEXANDER TSCHENALOFF,
 H. A. LOVIAGUINE.

---

Copies of this patent may be obtained for five cents each, by addressing the "Commissioner of Patents, Washington, D. C."